(No Model.)

S. M. VAUCLAIN.
METHOD OF MAKING WROUGHT IRON CAR WHEELS.

No. 408,056. Patented July 30, 1889.

Witnesses:
Alex. Barkoff
Robert T. Sanders

Inventor:
Samuel M. Vauclain
by his Attorneys
Howson & Howson

UNITED STATES PATENT OFFICE.

SAMUEL M. VAUCLAIN, OF PHILADELPHIA, PENNSYLVANIA.

METHOD OF MAKING WROUGHT-IRON CAR-WHEELS.

SPECIFICATION forming part of Letters Patent No. 408,056, dated July 30, 1889.

Application filed April 22, 1889. Serial No. 308,117. (No model.)

*To all whom it may concern:*

Be it known that I, SAMUEL M. VAUCLAIN, a citizen of the United States, and a resident of Philadelphia, Pennsylvania, have invented certain Improvements in the Method of Making Wrought-Iron Car-Wheels, of which the following is a specification.

The object of my invention is to make a solid forged wrought-iron car-wheel in a less expensive manner than those hitherto adopted in the manufacture of wheels of this class; and this object I attain in the manner which I will now proceed to describe, reference being had to the accompanying drawings, in which—

Figure 1:
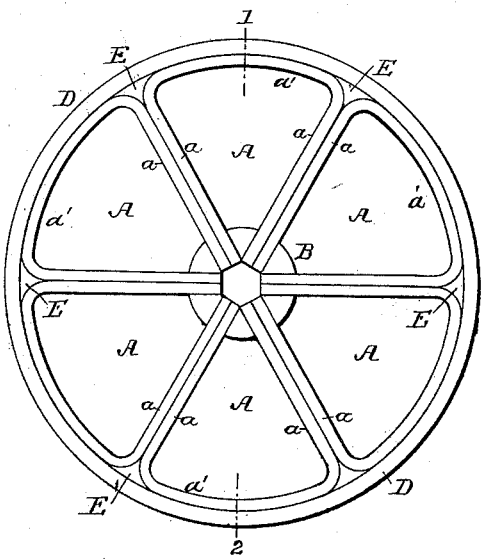
Figures 2, 3:
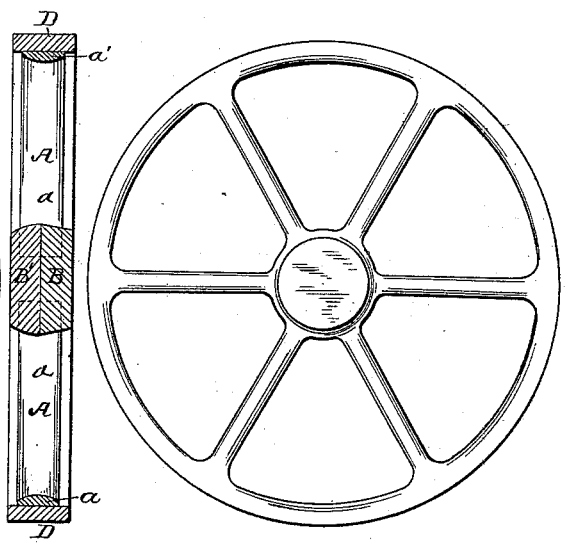
Figure 4:
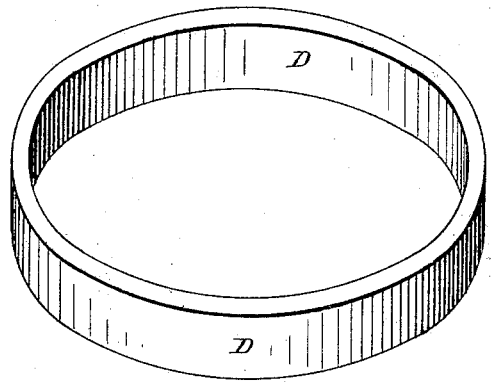
Figure 7:
Figure 9:
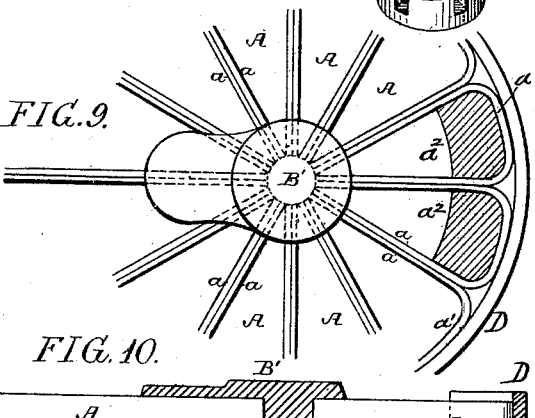
Figure 8:
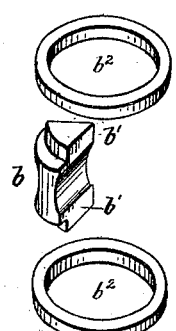
Figure 10:
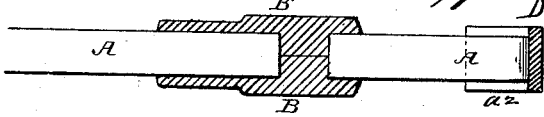

Figure 1 is a face view of my improved car-wheel before it is welded, one-half of the hub being removed. Fig. 2 is a face view of the finished car-wheel. Fig. 3 is a section on the line 1 2, Fig. 1. Figs. 4, 5, 6, and 7 are detached perspective views of parts of the wheel. Fig. 8 is a detached perspective view of a modified hub portion, and Figs. 9 and 10 are views showing the hub and crank-pin portion and balance-weight of the driving-wheel for a locomotive.

The main objection to wrought-iron car-wheels is the cost of manufacture, and it is to bring this item of expense to the minimum that my improved car-wheel has been devised, the essential feature of the invention being the building up of the wheel of a number of parts, inexpensive in themselves, and then welding or forging these parts together, so as form a solid homogeneous and extremely strong wheel.

Figures 5, 6:
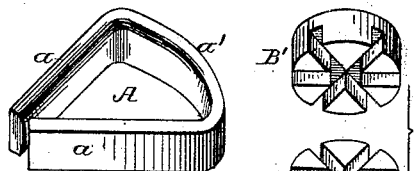

The iron from which the spokes are made is preferably rolled with one side flat and the other rounded, as shown in Fig. 3, this iron being cut into sections of the proper length and bent to the desired shape, as shown in Figs. 1 and 6, so as to form spoke portions $a$ and rim portions $a'$. To form the wheel, the sections are placed around in a circle, as shown in Fig. 1, the spoke portions $a$ $a$ of adjoining sections abutting each other, the inner ends of the spoke-sections $a$ being adapted to radial recesses $b$ in the under portion B of the hub. On top of this is placed a second and similar hub-section B', and these sections can be fastened together in any suitable manner. The portions $a'$ of the sections A form part of the rim of the wheel, and around these sections A is placed a band of bar-iron D, which forms the outer portion of the rim, as shown in Figs. 1 and 2, this band being made of any thickness or width required. In the spaces formed between the outer band D and the outer ends of the sections A are inserted filling-pieces E of the shape shown in Fig. 7.

The hub portions B B' can be forged in suitable dies, so that the recesses for the spokes and the rounded exterior portion of the hub can be formed at the same time. By having the hub made in the manner shown the spokes are properly centered by the application of their inner ends to the grooves or recesses in the hub-sections. In some instances, in place of having the hub made in two pieces, as shown in Fig. 5, the hub may consist of a series of wedge-shaped pieces $b$, adapted to be placed between each spoke, and having raised portions $b'$, over which are placed rings $b^2$ $b^2$. (See Fig. 8.) This form of hub I prefer to use where the necessary appliances for forging the larger hub-pieces are not available.

In forming the driving-wheels for locomotives I form the crank-pin piece on the hub, the latter comprising but two sections B B', recessed for the reception of the spokes, as in Fig. 5, and the necessary balance-weight pieces $a^2$ can be forged into proper shape and inserted between the spokes prior to the welding of the wheel together.

It will be seen by the above construction that the hub portions and the small blocks E are simple drop-forgings, while the spokes and rim are bent from bar-iron; hence the component parts of the wheel are all inexpensive.

After the wheel is built up, as shown in Fig. 1, it is placed in the furnace and heated to a welding heat and then removed, placed in a properly-formed set of dies, and by means of a steam-hammer or hydraulic machine the entire mass is welded or forged into one solid and unitary structure, as shown in Fig. 2.

It will be borne in mind that the shape of the bar-irons used for the spokes depends altogether upon the style of the wheel to be made, as the bar from which the spokes are made can be rolled in any shape most suitable for the purpose intended.

I claim as my invention—

1. The mode herein described of making a forged car-wheel, said mode consisting in first forming an outer rim-section, hub-sections, and spoke-sections, confining the inner ends of the spoke-sections by the hub-sections and the outer ends of the spoke-sections by the outer rim, heating the composite structure to a welding heat, and finally subjecting it to the action of dies, whereby it is welded into a solid mass, substantially as specified.

2. The mode herein described of making a forged car-wheel, said mode consisting in bending a series of bars so that each forms a spoke-section comprising a rim portion and spoke portions, confining the inner ends of the spoke portions by suitable hub-sections, confining the spoke-sections by an outer rim, filling the openings between the outer ends of the spoke-sections and the outer rim, and then heating the structure so formed to a welding heat and subjecting it to the action of dies, whereby its parts are welded into a solid mass, substantially as specified.

3. The mode herein described of making a forged driving-wheel, said mode consisting in bending a bar to circular form for the rim of the wheel, bending other bars to form rim portions and radiating spoke portions, forging opposite hub and crank sections and balance-weight sections, fitting the various parts together, and heating the composite structure, and then subjecting it to the action of dies, whereby the parts are welded together, substantially as set forth.

In testimony whereof I have signed my name to this specification in the presence of two subscribing witnesses.

SAMUEL M. VAUCLAIN.

Witnesses:
WILLIAM D. CONNER,
HENRY HOWSON.